US005429208A

United States Patent [19]

Largillier et al.

[11] Patent Number: 5,429,208

[45] Date of Patent: Jul. 4, 1995

[54] DEPRESSURIZATION DEVICE FOR THE BEARING LUBRICATING CHAMBERS OF A TURBOMACHINE

[75] Inventors: Christian Largillier, Le Mee Sur Seine; Jérome Friedel, Blandy Les Tours, both of France

[73] Assignee: Societe Nationale D'Etude Et De Construction De Moteurs D'Aviation "SNECMA", Paris, France

[21] Appl. No.: 248,647

[22] Filed: May 25, 1994

[30] Foreign Application Priority Data

May 25, 1993 [FR] France ............................ 93 06206

[51] Int. Cl.[6] ........................ F01M 9/00; F02C 7/06

[52] U.S. Cl. ................................ 184/6.11; 60/39.08

[58] Field of Search ..................... 184/6.11; 60/39.08, 60/39.07

[56] References Cited

U.S. PATENT DOCUMENTS 2,432,130 12/1947 Serrell et al. .
2,487,842 11/1949 Whiteman et al. .
2,571,166 10/1951 Rossetto .
2,888,097 5/1959 Scheffler .
4,105,093 8/1978 Dickinson ........................ 60/39.08
4,511,016 4/1985 Döell ................................ 184/6.11
4,717,000 1/1988 Waddington ...................... 60/39.08
4,888,947 12/1989 Thompson ........................ 184/6.11
5,045,711 9/1991 Swearingen .
5,046,306 9/1991 Borre, Jr. ......................... 184/6.11
5,121,599 6/1992 Snyder et al. ..................... 60/39.08

FOREIGN PATENT DOCUMENTS 2536120 5/1984 France .
2084266 4/1982 United Kingdom ............... 184/6.11

*Primary Examiner*—Thomas E. Denion
*Attorney, Agent, or Firm*—Oblon, Spivak, McClelland, Maier, & Neustadt

[57] ABSTRACT

A depressurization device for the lubrication chambers which surround the bearings of a turbomachine comprises venting ducts which communicate the lubrication chambers with the outside, and is provided with an auxiliary pumping mechanism which is arranged to be operated, when required, by way of an external pressure source. Preferably the venting ducts are provided with an air/lubricant separator and the auxiliary pumping mechanism comprises a jet nozzle which is located in the air exhaust duct from the separator, the external pressure source being the compressor of another turbomachine.

10 Claims, 3 Drawing Sheets

DEPRESSURIZATION DEVICE FOR THE BEARING LUBRICATING CHAMBERS OF A TURBOMACHINE

BACKGROUND OF THE INVENTION

1. Field of the Invention

The invention relates to turbomachines, such as aircraft turbojet engines, in which the bearings are permanently lubricated by liquid lubricant feed circuits during operation. Such a circuit normally includes a liquid lubricant reservoir, and a pump for delivering the lubricant to a nozzle situated in the immediate vicinity of each of the bearings. The bearings are mounted in lubrication chambers which are closed by seals and from the, bottom of which a duct leads for the recovery of an emulsion consisting of the liquid lubricant mixed with air. Incorporated in this duct is a recovery pump which delivers the above-mentioned emulsion to a liquid lubricant/air separator after first having been cooled in a suitable cooling device. From the separator the cooled liquid is returned to the reservoir, while the air is evacuated directly to the outside through an exhaust port.

The lubrication chambers surrounding the bearings in a turbomachine are located in areas which are at an excess pressure relative to the internal pressure of these chambers under normal operational conditions of the turbomachine, the excess pressure usually being provided by the compressor of the turbomachine. This arrangement normally prevents any escape of liquid lubricant to the outside of the lubrication chambers.

However, when the operating speed of the turbomachine is below its idling rate, the pressure normally prevailing outside the lubrication chambers may come close to the pressure prevailing inside the chambers, and may even fall below this pressure. Such conditions may particularly occur when there is a considerable fall in the rotational speed for whatever reason, when the machine cuts out and rotates only in self-rotation, when attempts at restarting the machine are made from stop, and when the machine operates without ignition.

Such a reduction in the pressure which normally prevails outside the lubrication chambers of the bearings in a turbomachine causes leakage of lubricant towards the outside of the lubrication chambers. This leakage results in a pollution of the turbomachine and of its immediate environment, which can be seen from the outside. On an aircraft, such leakage results in depletion of the necessarily reduced reserve of lubricant liquid, which can put at risk the engines and, consequently, the aircraft.

2. Summary of the Prior Art

To solve this problem, it is known to fit the lubrication system of a turbomachine with a device for depressurizing the lubrication chambers of the bearings, such as described in FR-A-2 536 120. This device establishes a communication between each chamber and the outside, and maintains in these chambers a pressure equal to the outside pressure increased only by the pressure drop due to the flowing of the air-lubricant emulsion in the device. This device normally comprises a duct, termed a venting duct, connected to each chamber, at least one air-lubricant separator which is usually that of the turbomachine, and an exhaust duct extending from the separator.

However, the device remains ineffective at the low speeds of the turbomachine mentioned earlier, as the compressor no longer provides excess pressure around the lubrication chambers;.

SUMMARY OF THE INVENTION

It is an object of the invention therefore to provide an improved depressurization device which permits the lubrication chambers which surround each of the bearings in a turbomachine to be further depressurized in certain conditions, so as to eliminate all risks of a leak of the lubricating liquid by ensuring that, under all operational conditions, the pressure ill the lubrication chambers is always lower than that prevailing outside the said chambers.

According to the invention this object is achieved by equipping the depressurization device of the lubrication chambers with auxiliary pumping means and connecting an external pressure source, preferably the compressor of one or more other turbomachines, to the auxiliary pumping means for operating said pumping means when required, the device including means for controlling the auxiliary pumping means.

In such a device the control means is actuated when a monitoring system of the turbomachine detects that its rotational Speed falls below the normal idling speed. The auxiliary pumping means is then automatically actuated, the effect of which is to lower the pressure in the lubrication chambers sufficiently to prevent any risk of the lubricating liquid leaking out of the chambers.

In a preferred embodiment of the invention the auxiliary pumping means is constituted by a jet nozzle disposed in the exhaust duct of an air/lubricant separator serving the depressurization device, the nozzle being supplied with pressurized air from the external pressure source through a normally closed valve which constitutes the control means.

In another embodiment of the invention the auxiliary pumping means is constituted by a jet nozzle placed in each venting duct, all of the jet nozzles being supplied by pressurized air from the external pressure source through one or more normally closed valves which constitute the control means.

In the case where the turbomachine fitted with the depressurization device of the invention is used on a twin-engine aircraft, the source of external pressure for the device may be constituted by the compressor of the second turbomachine.

The depressurization device of the second turbomachine then preferably comprises a second jet nozzle disposed in the exhaust duct of the air/lubricant separator of the second turbomachine, this second jet nozzle being supplied by pressurized air from the compressor of the first turbomachine through a normally closed second valve.

It is possible to replace the jet nozzles by pumps comprising a blower driven by a turbine supplied with compressed air, but this solution is more costly. It may be noted also that the turbomachines, on grounds of weight and cost, are preferably each equipped with only one air/lubricant separator, which is mechanically driven, but the invention is applicable in the same way to depressurization devices comprising an air/lubricant separator specific to the device.

Preferably the compressors of the first and second turbomachines are connected to the respective jet nozzles by ducts including a common section, and a nonreturn valve is disposed in each duct between the respective compressor and the common section.

The improved device in accordance with the invention bas the advantage of being light, which is especially important for aircraft. The device is simple and may be made without moving parts other than the valves and closure means for the ducts. The device is consequently reliable and inexpensive.

Further features and advantages of the invention will become apparent from the following description of two preferred embodiments of the invention, given by way of example, with reference to the attached drawings. FIG. 1 shows diagrammatically two turboshaft engines of multiple-engine aircraft, each having associated therewith a depressurization device in accordance with one embodiment of the invention.

DESCRIPTION OF THE PREFERRED EMBODIMENTS

Figure 1:
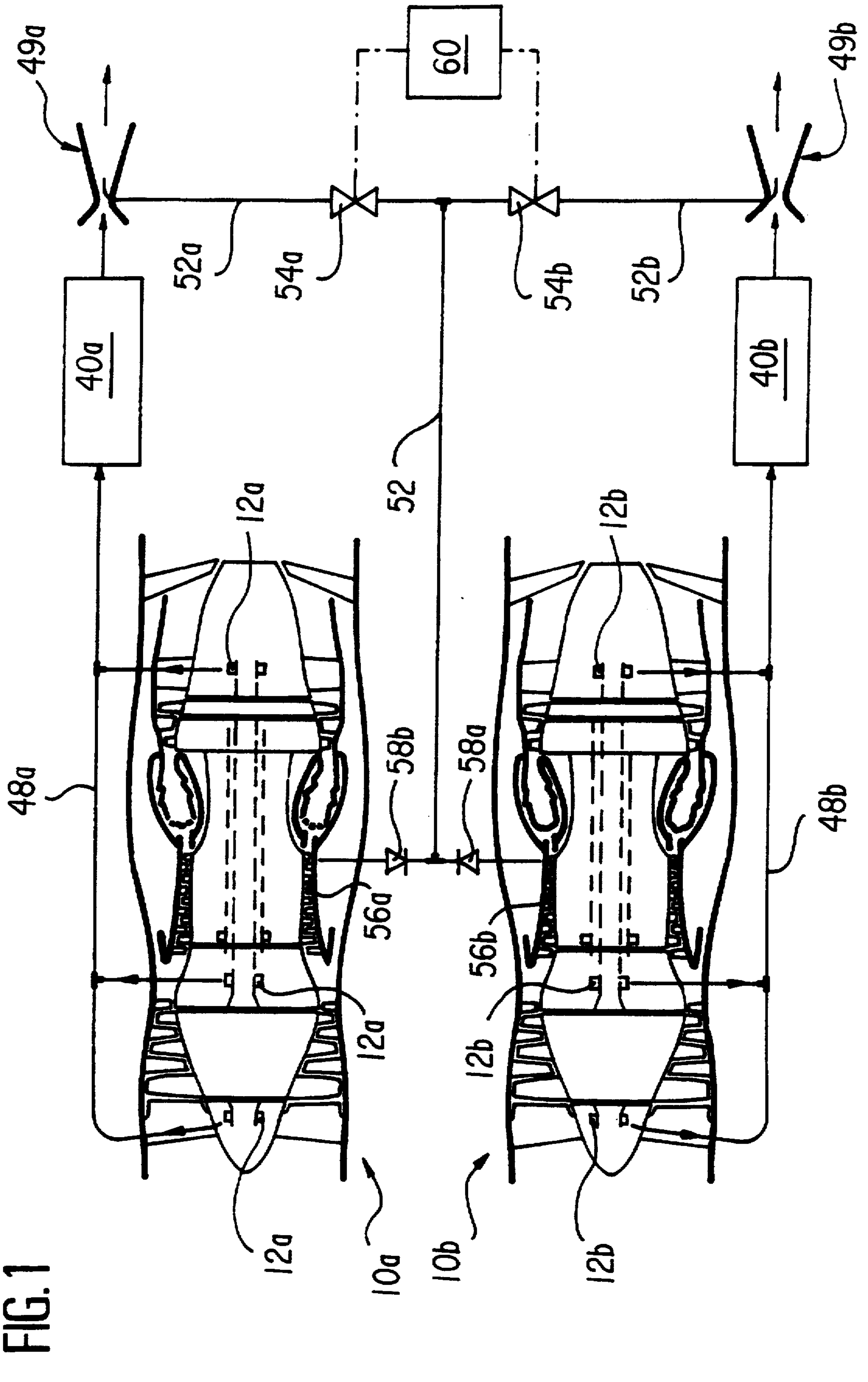

In FIG. 1 the references **10*a* and 10*b* indicate in a general manner two turbojet engines of a multi-engine aircraft. The rotating parts of each of these engines 10*a* and 10*b* are supported by bearings, the nature and the number of which depend on the type of engines involved. Three of these bearings are shown in each of the engines, being indicated by 12*a* in the engine 10*a* and by 12*b* in the engine 10*b***.

The lubrication of the bearings **12*a*, 12*b* in the engines 10*a*, 10*b* is ensured by two lubricating liquid feed circuits 24*a*, 24*b***. One of these two circuits is shown diagrammatically in FIG. 2, but since they are identical it will be understood that the other is constructed in a similar manner.

Figure 2:
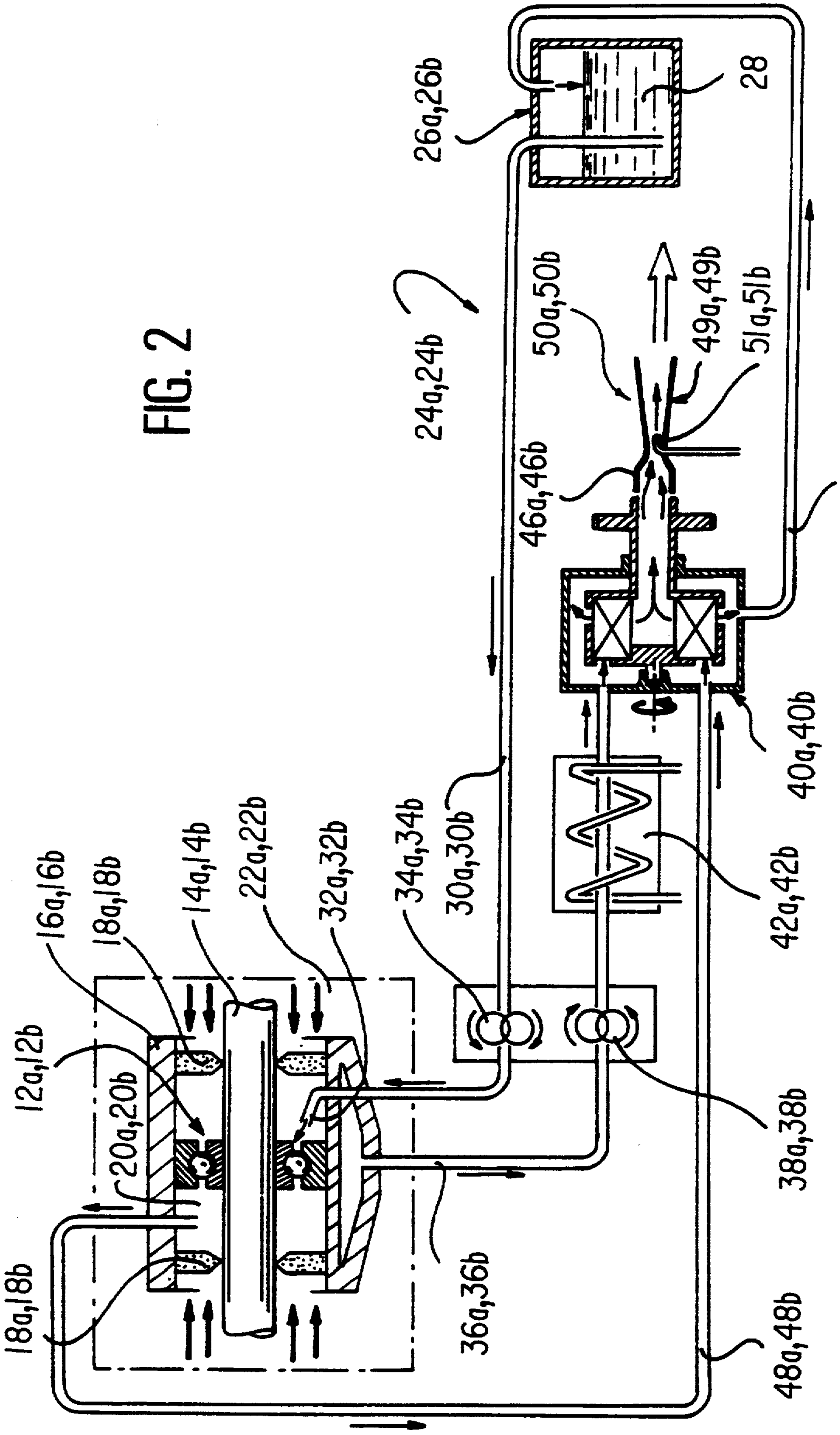
FIG. 2 is a diagram showing in greater detail a lubricant supply and return circuit for the bearings of one or other of the turboshaft engines, together with the part of the depressurization device which is associated with this circuit.

For the sake of convenience, only one bearing **12*a*, 12*b* has been represented in FIG. 2, but it will be understood that in practice the circuit 24*a*, 24*b* will feed lubricating liquid to all the bearings of the corresponding turbojet engine 10*a*, 10*b*. In addition, although the bearing 12*a*, 12*b*** shown in FIG. 2 is a ball bearing, it will be understood that other types of bearings may equally be involved.

As indicated in FIG. 2, the bearing **12*a*, 12*b* is interposed between a rotatable part, constituted here by a shaft 14*a*, 14*b*, and a non-rotatable part 16*a*, 16*b*. 0n both sides of the bearing 12*a*, 12*b* this non-rotatable part 16*a*, 16*b* supports a rotary seal 18*a*, 18*b*. A lubrication chamber 20*a*, 20*b* is thus defined in a substantially fluid-tight manner around the bearing 12*a*, 12*b*. The lubrication chamber 20*a*, 20*b* is situated in an area 22*a*, 22*b*** of the turbojet engine which is normally over-pressurized relative to atmospheric pressure, the over-pressure being produced by the compressor of the engine.

Under normal operating conditions of the turbojet engine the arrangement which has just been described ensures that the lubricating liquid, such as oil, introduced into the lubrication chamber **20*a*, 20*b* by the feed circuit 24*a* 24*b* remains confined in this chamber as a consequence of the pressure difference which prevails between the area 22*a*, 22*b* and the lubrication chamber 20*a*, 20*b***.

The feed circuit **24*a*, 24*b* includes a tank 26*a*, 26*b* filled with lubricating liquid 28. A duct 30*a*, 30*b* for the delivery of lubricating liquid connects the tank 26*a*, 26*b* to a nozzle 32*a*, 32*b* situated in each of the lubrication chambers 20*a*, 20*b* surrounding the bearings 12*a*, 12*b* of the turbojet engine 10*a*, 10*b*. The nozzles 32*a*, 32*b* are directed towards the bearings 12*a*, 12*b* so as to spray the latter continuously with lubricating liquid 28 when the engine is operating. For this purpose, the lubricating liquid delivery duct 30*a*, 30*b* includes a lubricating liquid injection pump 34*a*, 34*b***.

The lubricating liquid injected under pressure into each of the lubrication chambers **20*a*, 20*b* falls back under gravity to the slanting bottom of the chamber, from where it is recovered as a lubricating liquid/air emulsion by means of a duct 36*a*, 36*b* fitted with a lubricating liquid recovery pump 38*a*, 38*b*. The pump 38*a*, 38*b* delivers the emulsion to a separator 40*a*, 40*b* for separating the lubricating liquid and the air. Between the pump 38*a*, 38*b* and the separator 40*a*, 40*b*, the duct 36*a*, 36*b* passes through a cooling exchanger 42*a*, 42*b*** which lowers the temperature of the lubricating liquid by heat exchange with the aircraft fuel.

The lubricating liquid/air separator **40*a*, 40*b* is a centrifugal device of known construction, comprising fins or cellular masses which rotate to cause separation of the air from the lubricating liquid under centrifugal action. The lubricating liquid is recovered from the bottom of the separator 40*a*, 40*b* by a duct 44*a*, 44*b* which returns the liquid to the tank 26*a*, 26*b*. The air escapes from the separator 40*a*, 40*b* along a central exhaust duct 46*a*, 46*b*. If for any reason, the speed of either of the turbojet engines 10*a*, 10*b* falls below idling speed, the excess pressure usually prevailing in the zone 22*a*, 22*b* surrounding each of the lubrication chambers 20*a*, 20*b* can for a while drop below the pressure prevailing inside the chambers. In this event lubricating liquid can leak from the chambers 20*a*, 20*b* and cause internal pollution of the turbojet engine. In some cases, lubricating liquid may also find its way into the flow path of the air for the internal operation of the aircraft. Furthermore, a substantial leak can seriously deplete the reserve of lubricating liquid and thus put the engine and the aircraft in danger. To eliminate this risk it is usual to provide the lubrication circuit 24*a* and 24*b* of each of the turbojet engines 10a and 10b with a device permitting the depressurization of the lubrication chambers 20*a*, 20*b***.

The depressurization device comprises a venting duct **48*a*, 48*b* for establishing communication of the lubrication chamber 20*a*, 20*b* surrounding each of the bearings of the respective engine with free air. The duct 48*a*, 48*b* opens into the upper part of each lubrication chamber 20*a*, 20*b* and connects the lubrication chamber to a separator 40*a*, 40*b* which separates lubricating liquid and air and which has an air exhaust 46*a*, 46*b*. Generally speaking, and for obvious economic reasons, the same air/lubricant separator 40*a*, 40*b* and exhaust duct 46*a*, 46*b* will be used for the depressurization device and for the lubricant recovery circuit involving the ducts 36*a*, 36*b* and 44*a*, 44*b***.

The venting ducts **48*a*, 48*b* connect each lubrication chamber 20*a*, 20*b* to the common separator 40*a*, 40*b* of the engine 10*a*, 10*b*, and enable the pressure prevailing in each of the lubrication chambers 20*a*, 20*b*** to be maintained at a level close to atmospheric pressure.

In order that the pressure prevailing in the lubrication chambers **20*a*, 20*b* may be lowered still further when, under particular operating conditions of one or other of the turbojet engines 10***a* and 10*b*, the pressure in the zone 22*a*, 22*b* falls to a value close to atmospheric pressure, in accordance with the invention the depressurization device is provided with an auxiliary pump, preferably situated downstream of the lubricating liquid/air separator 40*a*, 40*b* in the exhaust duct 46*a*, 46*b* of the separator.

In the embodiment represented in FIGS. 1 and 2 this auxiliary pump is constituted by a jet nozzle 49*a*, 49*b* comprising a convergent-divergent unit 50*a*, 50*b* placed in the duct 46*a*, 46*b*, and a nozzle 51*a*, 51*b* opening in the vicinity of the part of smallest section in the convergent-divergent unit and directed downstream. The nozzles 51*a*, 51*b* of each of the jet nozzles 49*a*, 49*b* is connected to a pressurized air supply duct 52, 52*b* (FIG. 1), and in operation the jet issuing therefrom draws with it to the outside the air exiting from the separator 40*a*, 40*b* along the duct 46*a*, 46*b*. Each of the ducts 52*a* and 52*b* includes a valve 54*a*, 54*b* which is normally closed to render the jet nozzle 49*a*, 49*b* inoperative, i.e. when the respective engine is operating in a manner which does not bring about risk of leakage of lubricating liquid to the outside of the lubrication chambers 20*a*, 20*b*.

In the embodiment illustrated in FIG. 1, the end of the duct 52*a* remote from the jet nozzle 49*a* opens into the compressor 56*b* of the turbojet engine 10*b*, and the end of the duct 52*b* remote from the jet nozzle 49*b* opens into the compressor 56*a* of the turbojet engine 10*a*. A portion of each duct 52*a*, 52*b* between the compressors 56*a* and 56*b* and the valves 54*a* and 54*b* is formed by a common section 52, and a non-return valve 58*a* is located in the part of the duct 52*a* between the compressor 56*b* and the common section 52, and a non-return valve 58*b* is located in the part of the duct 52*b* between the compressor 56*a* and the common section 52.

In operation, the valve 54*a* or 54*b* is opened automatically under the control of a suitable circuit 60 when the data supplied to this circuit by sensors provided in the turbojet engine 10*a* or 10*b* reveal that the operating speed of the latter is inadequate to ensure that the lubricating liquid will be confined inside the lubrication chambers 20*a*, 20*b* which surround each of the bearings of the engine. Opening the valve 54*a* immediately establishes communication between the air compressor 56*b* of the turbojet engine 10*b* and the injection nozzle of the jet nozzle 49*a*. A pumping effect is then immediately imposed on the air situated in the lubrication chambers 20*a* surrounding the bearings 12*a* of the engine 10*a*, which creates a partial vacuum in these chambers and hence prevents any risk of lubricating liquid leaking from the chambers.

The operation of the depressurization device which is associated with the turbojet engine 10*b* is identical to that of the device associated with the turbojet engine 10*a* . It is controlled by the opening of the valve 54*b*, and results in the creation of a partial vacuum in the lubrication chambers 20*b* which surrounds the bearings 12*b* of the engine 10*b*.

Figure 3:
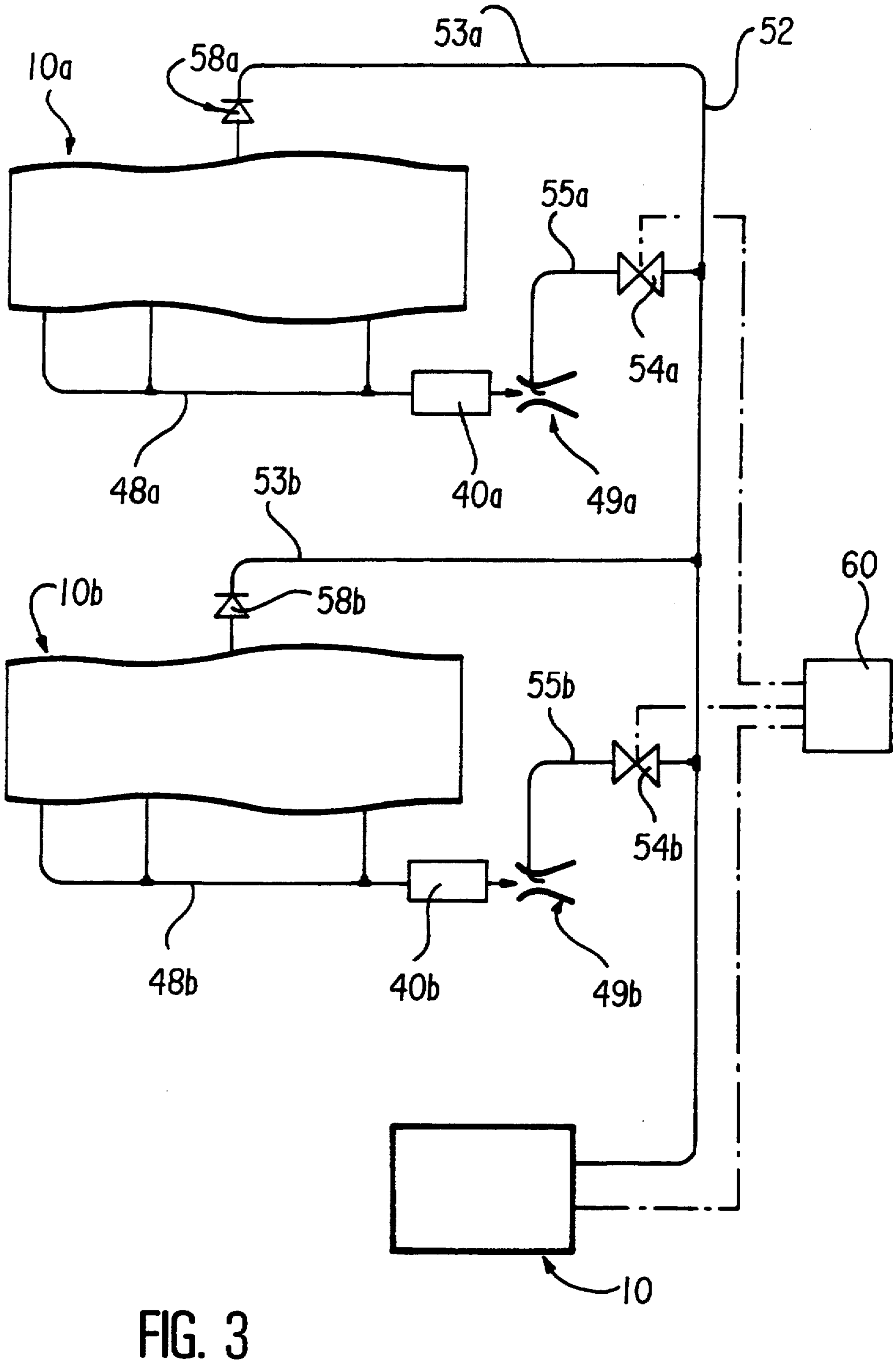
FIG. 3 shows diagrammatically two of the engines of a multi-engine aircraft, each having associated therewith a depressurization device in accordance with an alternative embodiment of the invention.

FIG. 3 shows a second embodiment of the invention which can be applied to an assembly of two or more turboshaft engines. For the sake of clarity, only two engines 10*a* and 10*b* are shown, but the following description applies similarly to a greater number of engines.

Each turboshaft engine is set up and connected in the same way as the others, and hence the embodiment will be described only in relation to the engine 10*a*. The compressor of the engine 10*a* is connected to a common duct 52 by a duct 53*a* fitted with a non-return valve 58*a* which permits the flow of air only in a direction towards the compressor-common duct 52. Connected on the enclosures surrounding the bearings of the engine 10*a* are the venting ducts 48*a* which lead to free air via an oil separator 40*a*. The cleansed air issuing from the separator 40a is conducted to the inlet of a jet nozzle 49*a* which is arranged to be supplied with pressurized air by a duct 55*a* connected at its other end to the common duct 52. The duct 55*a* includes a closure means 54*a* which is normally closed and is automatically controlled by a suitable circuit 60 fitted to the aircraft.

Other turboshaft engines 10 may be arranged and connected in the same way to the common duct 52 under control from the circuit 60, as shown for the engines 10*a* and 10*b*.

In operation the common duct 52 is supplied with pressurized air by the compressors of the turbomachines 10, 10*a*, 10*b* which are connected to it, but there is normally no air flow in the common duct 52 because all the closure means 54*a*, 54*b* etc. are normally closed. If one of the engines, for example the engine 10*a*, falls below its idling speed, this is detected by the circuit 60 of the aircraft which then opens the closure means 54*a*. Pressurized air from the duct 52 is thus delivered to the jet nozzle 49*a* through the duct 55*a*, thus causing a lowering of pressure in the jet nozzle 49*a* which is transmitted to the enclosures surrounding the bearings of the engine 10*a* through the oil separator 40*a* and the duct 48*a*.

The embodiments which have just been described with reference to FIGS. 1 to 3 apply solely to multi-engined aircraft. In the more generation case of the prevention of leakage of lubricating liquid from the lubrication chambers which surround the bearings of a turbomachine of any type, it is possible to connect the nozzle of the jet nozzle placed in the venting duct to an external source of compressed air.

It will be noted that the implementation of auxiliary pumping means 49*a*, 49*b* in the depressurization device of the bearing chambers 12*a*, 12*b* in accordance with the invention is advantageous on account of the fact that the presence of the venting ducts 48*a*, 48*b* permits the drop in pressure produced by the pumping means 49a, 49b to be transmitted to the said chambers 20*a*, 20*b*.

Placement of the pumping means 49*a*, 49*b* in the lubricant recovery duct 36a, 36b would not be effective, as the recovery pumps 38*a*, 38*b* are usually of the positive displacement type, for example geared pumps, and would oppose the transmission of the pressure fall between the chambers 12*a*, 12*b* and the outside. Moreover, whatever their type, the recovery pumps 38*a*, 38*b* generate substantial pressure variations which could not be compensated by the pumping means 49*a*, 49*b* of the invention.

We claim:

1. In a turbomachine including bearings, lubrication chambers surrounding said bearings, a liquid lubricant feed circuit for supplying lubricating liquid under pressure to said lubrication chambers, and a depressurization device for said lubrication chambers, said depressurization device comprising venting duct means which communicate said lubrication chambers with an outside, wherein said depressurization device further comprises auxiliary pumping means, and an external pressure source is connected to said auxiliary pumping means for operating said auxiliary pumping means when required.

2. A turbomachine in accordance with claim 1, wherein said auxiliary pumping means is disposed in said venting duct means.

3. A turbomachine according to claim 1, wherein said depressurization device includes an air/lubricant separator, and said venting duct means opens into said separator, said separator having an air exhaust duct, said wherein said auxiliary pumping means is disposed in said air exhaust duct.

4. A turbomachine according to claim 1, wherein said auxiliary pumping means comprises a jet nozzle.

5. A turbomachine according to claim 1, wherein said depressurization device further comprises control means for controlling said auxiliary pumping means.

6. A turbomachine according to claim 5, wherein a pressurized fluid supply duct means connects said external pressure source to said auxiliary pumping means, and said control means comprises a valve disposed in said pressurized fluid supply duct means.

7. A turbomachine according to claim 6, wherein said valve is normally closed, and said control means includes means for opening said valve when a speed of said turbomachine falls below a predetermined value.

8. A turbomachine according to claim 1, wherein said external pressure source is the compressor of another turbomachine.

9. A turbomachine according to claim 1, wherein said turbomachine includes a compressor and is a first of at least two similar turbomachines, and wherein said external pressure source of said first turbomachine is formed by the compressor of a second of said at least two similar turbomachines, and the external pressure source of said second turbomachine is formed by the compressor of said first turbomachine.

10. A turbomachine according to claim 9, wherein first duct means are provided to connect said compressor of said second turbomachine to the auxiliary pumping means of said first turbomachine, and second duct means are provided to connect said compressor of said first turbomachine to the auxiliary pumping means of said second turbomachine, said first and second duct means including a common section, and wherein a non-return valve is provided in each of said first and second duct means between said common section and said compressor of the respective turbomachine.

* * * * *

UNITED STATES PATENT AND TRADEMARK OFFICE

CERTIFICATE OF CORRECTION

PATENT NO. : 5,429,208

DATED : July 4, 1995

INVENTOR(S) : Christian Largillier et al

It is certified that error appears in the above-indentified patent and that said Letters Patent is hereby corrected as shown below:

In column 1, line 16, after "the" delete the comma.

In column 2, line 2, after "chambers" delete the semicolon;

line 11, change "ill" to --in--.

In column 3, between lines 11 and 12 insert --BRIEF DESCRIPTION OF THE DRAWINGS--;

line 65, after "24a" insert --,--.

In column 5, line 47, after "the" (second occurrence) insert --air--.

In column 6, line 36, change "generation" to --general--.

In column 7, line 10, change "said" (second occurrence) to --and--.

Signed and Sealed this

Twenty-second Day of April, 1997

Attest:

BRUCE LEHMAN

*Attesting Officer*

*Commissioner of Patents and Trademarks*